United States Patent
Sanduja et al.

(10) Patent No.: US 6,783,865 B2
(45) Date of Patent: Aug. 31, 2004

(54) COATING COMPOSITION FOR HIGH DENSITY POLYETHYLENE TUBING

(75) Inventors: Mohan L. Sanduja, Flushing, NY (US); Carl Horowitz, Brooklyn, NY (US); Robert Mishiyev, Brooklyn, NY (US); Paul Thottathil, New Hyde Park, NY (US)

(73) Assignee: Logstor Ror A/S, Logstor (DK)

( * ) Notice: Subject to any disclaimer, the term of this patent is extended or adjusted under 35 U.S.C. 154(b) by 0 days.

(21) Appl. No.: 09/852,987

(22) Filed: May 10, 2001

(65) Prior Publication Data

US 2002/0122945 A1 Sep. 5, 2002

Related U.S. Application Data

(60) Provisional application No. 60/203,840, filed on May 12, 2000.

(51) Int. Cl.[7] ................................. B32B 27/32
(52) U.S. Cl. .................... 428/523; 428/413; 428/424.8; 428/447
(58) Field of Search ................................. 428/523, 413, 428/424.8, 447, 420, 451, 36.91

(56) References Cited

U.S. PATENT DOCUMENTS

| | | | | |
|---|---|---|---|---|
| 4,170,664 A | * | 10/1979 | Spenadel et al. | ........... 252/511 |
| 4,377,010 A | * | 3/1983 | Fydelor et al. | .......... 128/113.1 |
| 5,039,549 A | * | 8/1991 | Nguyen et al. | .............. 427/322 |
| 5,215,822 A | * | 6/1993 | Wyman et al. | .............. 427/503 |
| 6,358,557 B1 | * | 3/2002 | Wang et al. | ................ 427/2.24 |

OTHER PUBLICATIONS

Kirk–Othmer Encycpedia of Chemical Technology, 4th ed., vol. 6, John Wiley & Sons, Inc.: 1993, pp. 692–694.*
Wolf, R. "Plastics, Additives" Ullman's Encyclopedia of Industrial Chemistry, Wiley–VCH: 2002, online posting date Jun. 15, 2000.*
"Ultra high molecular weight PE", Polymers–A Property Database, CRC Press. LLC: 2000.*

* cited by examiner

Primary Examiner—James J. Seidleck
Assistant Examiner—Melanie Bissett
(74) Attorney, Agent, or Firm—Steinberg & Raskin, P.C.

(57) ABSTRACT

Surface modified solid polyethylene and high density polyethylene products, together with compositions and methods for producing these products, are provided. Polymer coatings comprising vinyl, urethane, and/or epoxy are covalently grafted to polyethylene substrates. The grafted coatings optionally colorants, flame retardants, and the like, that impart desired improved properties to polyethylene substrates. Grafted substrates include, for example, boards, sheets, tubing, pipes and the like. The treated products are more fire resistant than untreated polyethylene and unlike untreated polyethylene, are also capable of retaining post-manufacturing paint, markings, or adhesives, as desired.

7 Claims, No Drawings

COATING COMPOSITION FOR HIGH DENSITY POLYETHYLENE TUBING

This application claims benefit of 60/203,840 filed May 12, 2000.

BACKGROUND OF THE INVENTION

Polyethylene ("PE") has many desirable mechanical properties and it is readily synthesized, and manufactured in any desired shape and size. In particular, there are many uses for PE, in its several grades, and particularly for high density polyethylene ("HDPE") in the form of tubing, pipes, conduits, and the like. For ease of reference, the use of the term, "pipe" or "piping" in the singular or plural herein, should be understood to also encompass any other configuration of tubing or conduit, and the joiner and/or connector components, such as straight joints, elbow joints, end-caps and the like, unless otherwise specified.

It is also known to the art that many potential uses for pipe comprising PE, in whole or in part, have previously been impractical due to the inherent limitations of this polymer material. This is of particular concern in the manufacture of extruded, pre-insulated pipes for general industry, the building trades, ocean platforms, e.g., offshore oil and gas platforms, and ship building. In all of those environments, there is a demand for insulated pipes. Generally, pipes that are pre-insulated during the manufacturing process are more economical to produce and install. One preferred type of pre-insulated pipe has an inner carrier pipe, manufactured from any art-known material such as, for example, mild steel, stainless steel, PE formulated with any art-known copolymer ("PEX") and/or HDPE, and the like. This inner carrier pipe is jacketed with a foam insulating layer, e.g., a hard polyurethane foam, that is, in turn, jacketed by a protective outer shell, preferably of HDPE, although steel is used for some applications. Optionally, one or more additional layers of foam, or other insulating materials, e.g., mineral wool or fiberglass or similar material, can also be incorporated into the structure of such insulated pipe. This type of pipe, with an HDPE outer shell, is typically manufactured as a single unit by an extrusion process.

HDPE pipes, including insulated pipes with an HDPE outer shell, are economical to manufacture and install, light, strong, and corrosion resistant. Of particular importance for the ship-building industry, pre-insulated extruded HDPE pipe is more resistant to penetration of moisture into the insulating layer than are conventional insulated pipes. However, there are obstacles to wider use of this type of pre-insulated pipe manufactured solely from polymer materials. The most important obstacle is that pipe manufactured from conventional PE-based polymers, including HDPE, is generally unsuitable for use in areas where flame retardancy is required. For example, the melting point for HDPE is about 120° C. When exposed to sufficient heat for even a brief period of time, HDPE readily melts and forms burning drops which can spread fire and/or cause severe burns on contact with human skin and clothing. Once ignited, HDPE burns intensely, producing noxious gas and smoke.

Other shortcomings of conventional HDPE pipes, whether insulated or single wall, relate to difficulties in adhering coatings to HDPE. PE-based polymers such as HDPE are among the most difficult polyolefins to successfully coat with a paint or glue, and there is a long-standing need in the art for a solution to this problem.

Paintability and/or gluing onto a surface is considered to require a minimum surface energy of at least 38 dynes/cm$^2$. In fact, it is considered that successful adhesion with most standard paints generally requires a surface energy over 50 dynes/cm$^2$, but HDPE is reported to have a surface energy of only about 31 dynes/cm$^2$. A surface energy of 80 dynes/cm$^2$, or higher, is considered to be best for optimum post-manufacture painting, marking or adhesion, particularly when the paint or adhesive must remain on the surface for many years, while withstanding extreme environmental conditions.

The requirement for painting relates to the practical and economic importance of color coding for identification of specific components in the construction and maintenance of tubing, pipes and/or conduits in a complex installation. The requirement for gluing and adhesion relates, for example, to the practical need to attach other construction materials, as well as markings and/or indicia of various kinds, to the pipe after installation.

Previous efforts to address some of these shortcomings in HDPE pre-insulated pipes have required the use of a metal-jacketed pre-insulated pipe for the outer shell to provide flame retardancy and paintability. However, the use of a metal jacket, e.g., steel, as the outer shell adds weight and cost to manufacture and installation, among other limitations.

Another way in which the surface properties of materials formed of PE-based polymers have previously been enhanced is by blending other polymers with the stock polyethylene, before extrusion, to impart flame retardant properties and/or paintability. For example, various products are commercially available in the form of granules, which, when blended with HDPE during manufacture, impart some protection against heat and flame. However, they all have the disadvantage that they change the mechanical properties for polyethylene. In addition, the processing requirements of blending other polymers into the HDPE adds to the costs of materials, and requires custom manufacture, which makes it difficult to economically supply pipe as required by the end user in the various industries.

Yet another problem with conventional PE compositions is its sensitivity to degradation by ultraviolet radiation in outdoor applications. The normal color of polyethylene is a milk-white. One way that PE has previously been protected from ultraviolet radiation in outdoor applications is by the addition of carbon black to the composition. Of course, this does not help any of the other shortcomings of PE, and for outdoor applications, a black PE composition can experience excessive heating from the infrared portion of sunlight, particularly with outdoor use in regions with a high solar flux, such as the tropics.

Another possible method for enhancing surface properties of polymeric materials is by grafting or bonding coatings onto the surfaces in need of such treatment. Polymers have been grafted onto non-metallic substrate surfaces, such as cellophane, and polyolefins. For example, U.S. Pat. No. 5,753,557 describes grafting of a polymer onto cellophane using ultrasound to cure the grafted layer. U.S. Pat. Nos. 5,342,659 and 5,232,748, describe grafting of a polymer onto cellophane using radiation energy, e.g., microwave, laser or ultrasonic energy to cure the grafted layer.

U.S. Pat. No. 3,880,580 describes methods of activating polymer substrates such as polyolefins, polypropylene, polyester and polyvinylchloride materials to accept sulfonation in the presence of a chlorinating hydrocarbon solvent, so that the grafted substrate can be dyed.

U.S. Pat. No. 5,407,728 describes a solution for grafting a polymer onto fabrics, such as polyamides, polyaramids or polyesters, to enhance flame retardant properties and resistance to fraying, for use in the manufacture of fabrics, including fabrics for airbags. As described by U.S. Pat. No. 5,741,548, polymers can be grafted onto fabrics, including polyethylene fabrics, to enhance the printability of satin and reemay acetate fabrics.

The descriptions of the patents mentioned above provide grafting solutions for very specific purposes, which cannot be readily generalized to other materials. Nowhere do any of these patents teach or suggest grafting onto solid PE or PE-based polymers, to provide for enhanced flame retardant properties and other improved surface properties in pipes, beams and other similar articles of manufacture. For instance, U.S. Pat. No. 5,407,728 teaches the need to avoid excessive crosslinking in the graft coating to prevent undesirable stiffness, whereas in the graft coating of a solid substrate a high level of crosslinking is typically desired in order to enhance such properties as, e.g., flame retardancy and scratch resistance.

Thus, there remains a longstanding need in the art for methods and compositions for grafting selected coatings onto PE, including HDPE and other PE-based polymers, to provide improved surface properties, including flame retardancy, ease of painting, scratch and abrasion resistance with a surface energy of more than 80 dynes/cm$^2$, and other improvements.

SUMMARY OF THE INVENTION

Accordingly, the present invention provides methods and compositions for graft modifying the surfaces of PE, including HDPE and other PE-based polymer compositions. The inventive grafting process employs polyfunctional monomers/prepolymers, such as, for example, vinyl monomers, urethane and epoxy prepolymers which are chemically bonded to the PE surface by the grafting process provided herein.

Broadly, the invention provides for a graft coated substrate that includes one or more types of PE, wherein the graft coating is covalently bonded to the substrate, and the coating includes a non-polyethylene polymer or copolymer, such as a vinyl polymer, a urethane, an epoxy, a polysilicone and/or combinations thereof. Optionally, the graft coating also includes a pigment or colorant, a fire retarding agent, and/or combinations thereof In one embodiment, the substrate includes a PE having a density, for example, ranging from about 0.930 g cm$^{-3}$ to about 0.940 g cm$^{-3}$, or greater. The included polyethylene broadly has an average molecular weight ranging, e.g., from about 100,000 amu to at least 6×10$^6$ amu.

In another embodiment, the graft coated substrate is optionally a solid PE. By "solid" is meant a PE substrate that is not in the form of a filament, yarn, fabric or cloth material.

Thus, the substrate is preferably formed into an article of manufacture, either before or after the graft coating is applied to the substrate. The article of manufacture is any article suitable to be manufactured from material that includes a PE. Simply by way of example, the article of manufacture is advantageously a pipe or tube, a curved or planar sheet, a beam, a board, a rod or shaft, a container for solids or fluids, and/or combinations thereof Graft coated pipe according to the invention includes, for example, straight pipe, bent pipe, a straight pipe joint, an elbow joint, an end-cap, a heat-shrinkable joint, and combinations thereof. The graft coated pipe according to the invention also includes, for example, single wall pipe, pipe with a plurality of walls nested one within the other, pipe with a single insulating layer between two concentric walls, and pipe with a plurality of concentric insulating layers, to name but a few types of pipe that will benefit from the graft coating compositions and methods of the invention.

The graft coating provides polyethylene substrate with a number of improved properties, including the ability to resist melting and burning for a time period ranging from about 1 to about 18 minutes. This test is configured so that the article is exposed to a planar heated surface that is heated, e.g., by burning fuel (e.g., natural gas or propane), or electrical resistance, to a temperature ranging from about 800 to about 960 degrees C. The heating panel is a rectangle that measures about 25×51 cm, and the graft coated substrate that is tested is positioned at a distance of about 12.5 cm from the heating panel.

Further, the graft coating provides the polyethylene substrate with an improved surface energy allowing for post manufacture painting, coating, marking and adhesive application to the grafted surface. The graft coated substrate according to the invention has a surface energy ranging from about 56 to about 80 dynes/cm$^2$, or higher.

Processes for applying the graft coating to polyethylene substrates are also provided by the invention. One process according to the invention is a method for modifying the surface of a solid polyethylene substrate by covalently grafting a heat resistant coating onto the substrate by (a) applying to a PE substrate, e.g., a solid PE, a liquid composition that includes effective amounts of a monomer or prepolymer, a graft initiator, a catalyst and a polymerization promoter, under conditions effective to promote grafting of the monomer or prepolymer to the solid polyethylene substrate, to form a coating on the substate, and (b) curing the applied composition.

Optionally, the liquid composition of step (a) includes a pre-formed polymer, suitable to be grafted to the activated substrate surface, alone and/or in combination with one or more of the monomer/prepolymers. The polymer is, e.g., a vinyl polymer, a urethane, an epoxy, a polysilicone, and/or combinations thereof, suitable to be grafted to the PE surface. In a further optional embodiment, the liquid composition also includes a colorant such as a dye or pigment, and/or a fire retardant agent.

In another embodiment of the invention, the liquid composition is first prepared without the polymerization promoter, and the process further comprises the step of mixing the polymerization promoter with the liquid composition prior to application of the liquid composition to the substrate, which allows for a longer storage period for the prepared liquid composition.

The monomer or prepolymer is a vinyl monomer, a urethane monomer, an epoxy monomer and/or a silicon-based monomer or prepolymer. The graft initiator is an effective amount of a metal ion, e.g., present in a concentration ranging from about 0.01 to about 1.0%, by weight. For example the metal ion is an ion of iron, silver, cobalt, copper, cerium and/or combinations thereof. The catalyst is a peroxide present in the liquid composition in a concentration ranging from about 0.1 to about 5% by weight and includes, e.g., benzoyl peroxide, methyl ethyl ketone peroxide, 1-butyl hydroperoxide and/or combinations thereof. The process of claim 13 wherein the polymerization promoter is present in a concentration effective to react with, and crosslink, the monomer or prepolymer. The polymerization promoter is a polyfunctional aziridine liquid crosslinker.

In yet a further embodiment, the grafted substrate is a polyethylene having a density ranging, for example, from about 0.930 g cm$^{-3}$ to about 0.940 g cm$^{-3}$, or greater.

Optionally, the applied composition is self-curing, and/or cured by heating, and/or by exposure to ambient atmospheric moisture, e.g., when the monomer or prepolymer is a moisture curing (e.g., a moisture curing urethane). Depending upon the required conditions, the applied graft coating is cured at room temperature, e.g., for a period of time as long as 6 days, or by the application of heat, e.g., ranging up to about 200 degrees F. for a time period of as little as 30 minutes.

In a further still embodiment, the liquid composition further comprises a compatible flame retardant agent, such as a phosphorous-based flame retardant.

In any of the previously mentioned embodiments, the liquid composition is applied to the substrate by a method selected from the group consisting of brushing, dipping, spraying and/or combinations thereof.

In yet a still further composition, the invention provides for a solid polyethylene substrate, e.g., an article of manufacture such as an extruded polyethylene pipe, that includes a graft coating covalently bonded thereto, prepared by the process the above described methods.

DETAILED DESCRIPTION

The invention provides compositions and methods for chemically bonding or grafting a polymer or polymers to the surface of a substrate. The term "substrate" includes any object that is comprised of any PE or PE-based polymer or copolymer, e.g., PE formed into sheets, tubes, girders, clamps, brackets, folded sheets, and any other useful form or geometric shape. Optionally, the substrate is formed of solid PE, i.e., forms of PE that exclude fabric and/or fibrous forms of PE. Reference to "polyethylene" or "PE" herein should be understood to include all grades of polyethylene and/or mixtures of PE grades, unless otherwise specified. The PE can be substantially pure, e.g., comprising no more than 5% by weight of non-polyethylene materials. Alternatively, the PE is blended or mixed, or formed as a copolymer, in combination with other polymers, and/or derivatives of polyethylene.

Without meaning to be bound by any theory or hypothesis as to any proposed mechanism underlying the grafting reaction of the inventive process, the grafting reaction is believed to take place by means of a chain polymerization. This type of polymerization reaction, also referred to in the art as a "backbiting" reaction, consists of initiation and propagation reactions. Essentially, a graft initiator is contacted with the surface to be treated, e.g., a surface of an article formed in whole, or in part, of PE. It is believed that the graft initiator removes a hydrogen from the PE surface, and thereby induces radical formation in the polyethylene substrate. The radicals thus formed attack nearby carbon bonds, breaking the polyethylene chain(s). Once the substrate has been activated, selected polymers are linked to the substrate and/or selected monomers react to extend graft polymer chains onto the substrate surface at the activated break points. Further details concerning the inventive graft coatings and methods of making these coatings, are discussed below.

Substrates: Polyethylenes and Copolymers

As noted supra, the grafting processes of the invention can be applied to all grades of polyethylene, including derivatives, and mixtures and PE-copolymers formed with other types of polymer.

Preferably the polyethylene to be graft coated is a high density polyethylene or HDPE (>0.940 g cm$^{-3}$>0.0338 lb/in$^3$, MW approx. 100000);

Other embodiments of graft coated PE are formed from high density, high molecular weight polyethylene or HDPE-HWM (MW ranges from about 200,000 to about 500,000);

Further embodiments of graft coated PE are formed from HDPE-UHWM: High density, Ultra high molecular weight polyethylene (>0.940 g cm$^{-3}$>0.0338 lb/in$^3$, MW>10$^6$ to 6×10$^6$);

Further still, there are useful embodiments of the invention that are formed by graft coating PE-LD: Low density polyethylene (<0.930 g cm$^{-3}$<0.0334 lb/in$^3$), as well as PE-LLD: Linear low density polyethylene (0.918 to 0.935 g cm$^{-3}$/0.0334 to 0.0339 lb/in$^3$); PE-MD: medium density polyethylene (0.930 to 0.940 g cm$^{-3}$/0.0334 to 0.0338 lb/in$^3$); and combinations and blends of the above described grades of PE.

In further still embodiments of the invention, mixtures and blends of the above described PE with other polymers are also contemplated to be advantageously graft coated according to the invention. For example, shrinkable pipe joints are manufactured from two different types of polymer. A first type of shrinkable pipe joint is a mix of HDPE and PE-MD, and a second type is a mix of ethylene/vinyl acetate ("EVA") and PE-LD. Both types of PE, as well as other types, including polyethylene modified with flexible butyl-based rubber or polymer, are readily graft coated.

Of course, the artisan will appreciate that any other art-known types and grades of polyethylene-based materials not mentioned above will also benefit from grafting by the methods and compositions of the invention.

Articles of manufacture that can serve as useful substrates for graft coatings according to the invention include, for example, any art known pipe or pipe accessory or fitting.

Among pipe products preferably manufactured with the graft coatings of the invention are both pre-insulated and non-insulated PE pipes. In addition, pipe fittings, including joints, such as straight joints, elbow joints, T-joints and end caps, etc., are also contemplated to be manufactured with the graft coating of the invention.

Pre-insulated pipes include pipes manufactured with one or more insulating layers. Preferably, there are one or two insulating layers, although the artisan will readily appreciate that additional insulating layers are readily added when desired. For example, a pipe is readily constructed to include an inner carrier pipe, an insulating foam layer, e.g. a hard polyurethane, and a jacket of PE, such as HDPE, with a graft coating according to the invention applied to its outer surface. Such a pipe can optionally include additional art-known technical features, such as a tracer pipe embedded within the polyurethane foam insulation.

The inner carrier pipe is constructed of a material suitable for the intended purpose, and can comprise steel, copper, brass, or other art-known alloy, any of the various PE compositions mentioned supra, any commercially available epoxy fiberglass and/or polyvinyl polymer pipe, to name but a few possibilities. Where desired, when the inner carrier pipe comprises PE, the inner surface can optionally be coated with a graft coating according to the invention, to enhance the properties of the carrier pipe lining and to provide, for example, improved resistance to heat, solvent penetration, and microbial contamination, to name but a few ways that the inner surface of PE-based carrier pipe can be enhanced.

In a further embodiment, a multi-layer pre-insulated pipe can include one or more additional insulating layers, comprising the polyurethane foam found in the first layer, and/or optionally the second layer is manufactured from different insulation materials, including heat resistant fibrous materials such as, mineral wool and/or glass wool, or any other art-known insulating material.

In addition to pipes and pipe related articles, other types of articles too numerous to mention can be fabricated from polymers that include PE, and then graft coated for improved surface properties. Simply by way of example, graft coated articles that comprise PE include those suitable for use in space filling and structural support, in the form of sheets, boards, shafts, rods, or structural tubing, or in any other convenient shape or size that is desired.

Other examples of graft coated articles that comprise PE include boxes and containers fabricated in whole or in part with PE. For such containers, graft coating enhances such desirable properties as scratch resistance, paintability for ease of post-manufacture coating, marking or gluing, and flame retardancy for use in areas where this property is important. Flame retardancy in PE-based containers is important, for example, in boxes or containers that will be densely stacked in warehouses, that will hold safety equipment on ships, aircraft and other vehicles, and in the manufacture of containers for storing volatile and/or flammable solids, or flammable liquids such as fuels. Other containers comprised of PE that benefit from improved surface properties and reduced flammability include those for storing food oils, paints, solvents, cleaning agents, and the like.

Grafting Mechanisms and Reactions

The graft reaction can be better understood by considering the following steps (1a) through (3), wherein PE or —[CH$_2$—CH$_2$]$_n$— is the substrate ("S") the graft initiator is GI* and R' is the residue of the polyethylene chain. X is a unit of vinyl monomer. The selection of X governs the property or properties that are obtained. Optionally, a mixture of monomers are employed, and more than one property of the PE substrate can be modified or enhanced in a single processing step.

In step (1) the GI* induces radical formation ("S*") in the polyethylene substrate (1a).

Alternatively, the GI* activates reactive prepolymers or polymers ("P") in the reaction medium, to P* (1b) that in turn directly grafts to the HDP (1c).

  (1a)

  (1b)

  (1c)

When the reaction proceeds according to step (1a), initiation occurs as shown by step (2) below.

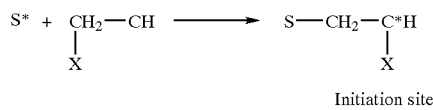

Initiation site

In step (3), chain propagation occurs, and continues.
(3) Chain Propagation

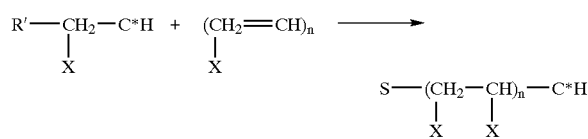

The graft initiator is optionally regenerated by reaction (4), as follows.

  (4)

The process may be terminated by radical combination as shown in reactions (5) and (6)

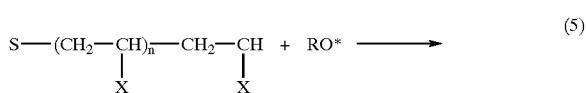  (5)

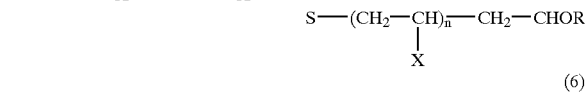  (6)

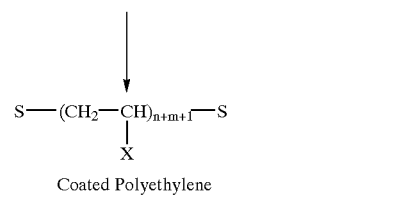

Coated Polyethylene (Wherein, n and m are integers defining subunit number, and can be the same or different.

Thus, when the reaction proceeds from step (1a) through steps (2) and (3), the new polymer structure forms at the initiation site and the chain is lengthened from that point until the reaction is terminated. When the reaction proceeds from steps (1b) and (1c); a preformed reactive polymer is linked directly with the PE surface. Both alternative reactions provide a coated polyethylene material that possess all the desirable properties of the selected grafted polymer coating.

Methods and Solutions for Grafting

As exemplified below, the grafting process is conducted by preparing a grafting solution. The grafting solution is applied to a PE substrate, exemplified as HDPE, by any available art-known method, including, e.g., brushing, spraying, dipping, spin coating, vapor deposition, and the like. The viscosity of the grafting solution is adjusted as needed, so that, for example, it is sufficiently viscous for application by dipping or brushing, without significant dripping or running of the applied solution, or sufficiently thin when optionally sprayed onto the surface to be treated.

For convenience, the grafting solution is optionally prepared in two parts: Part A and Part B.

Formulation of Part A

Part A of the grafting solution is prepared in a solvent compatible with the reagents selected for the grafting. Solvents are selected depending on the prepolymer and/or monomers employed, and can include polar solvents such as water, water soluble alcohols, ethers, esters, ketones, and derivatives and mixtures thereof, and nonpolar solvents such as organic solvents, e.g., aromatic solvents such as benzene and its derivatives, alkanes and/or alkenes and their derivatives, halogenated organic solvents, other readily available solvents.

Graft initiators are preferably metal ions including, for example, iron, silver, cobalt, copper, cerium and others.

More preferably, as exemplified herein, silver ion is employed. The graft initiators are preferably employed at a concentration ranging from about 0.01 to about 1.0%, and more preferably from about 0.001 to about 0.1% by weight, relative to the weight of prepolymer or monomer(s) present.

Catalysts are preferably peroxides, including, for example, hydrogen peroxide and any organic peroxide, such as, e.g., benzoyl peroxide, methyl ethyl ketone peroxide, 1-butyl hydroperoxide and derivatives and combinations thereof. The catalysts are preferably employed in a concentration ranging from about 0.1 to about 5%, or greater. More preferably, the catalysts are employed in a concentration ranging from about 0.05 to about 1.0% (by wt relative to the solution weight).

Monomers or prepolymers include, for example, organic-based monomers, silicon-based monomers, and/or combinations thereof. Organic-based monomers useful for grafting surfaces comprising PE preferably include urethane precursors. Urethane precursors include water-dispersed polyurethane monomers, e.g., NeoRez™ R-9679 (Avecia, Inc., Charlotte, N.C.). Other water-dispersed prepolymers include epoxy monomers, e.g., preferably including the epoxy monomer available as Epi-Rez™ (Shell Chemical Co., Parsippany, N.J.).

Aliphatic moisture-curable urethanes are also employed, e.g., the Spenlite™ M27-X-63 and/or the less viscous M22-X-40 (Reichhold Chemical, Inc., Research Triangle Park, N.C.), and D.R.R. G84 EK 40 epoxy resin (Dow Chemical) and/or combinations thereof.

Aromatic moisture curing urethanes include, for example, the Spenkel™ M21-X-40, M21-X-40LM, M23-X-56, M37-A6X-42, M67-100, M26-X-64 and M86-A6X-60 and/or combinations thereof (Reichhold Chemical, Inc., Research Triangle Park, N.C.).

Aromatic urethane prepolymers include, for example, the Spenkel™ P49-A60, P82-K4-75, and/or combinations thereof (Reichhold Chemical, Inc., Research Triangle Park, N.C.). Other art-known epoxy resins/prepolymers are also readily employed. These include, for example, epoxy prepolymer Araldite GZ 488-N-40, epoxy resin (Ciba Geigy Corp.).

Silicon-based monomers useful for grafting surfaces comprising PE preferably include silane prepolymers. Readily available silane monomers include organic silanes such as, vinyl alkyl-ethoxysilanes, e.g., vinyl triethoxy silane and vinyl trimethoxy silane monomers, e.g., SiV 9112.0 and SiV 9220.0, respectively, from Galest, Inc., Tullytown, Pa.), to name but a few. Combinations of any of the foregoing monomers/prepolymers may optionally be employed.

In one preferred embodiment, vinyl and epoxy functional silanes, such as the vinyl triethoxy silane and vinyl trimethoxy silane monomers described supra, are added to the grafting solution in order to provide improved paintability and scratch resistance to the grafted surface. Such an improved surface allows the grafted articles to be readily painted or marked in any color or treated with any other useful adhesives or coatings after manufacture. With these improved surface properties, the grafted surface can be easily color-coded after manufacture, and/or marked with letters, numbers and other indicia. In another preferred embodiment, the grafted articles can be readily fixed or affixed to other articles by means of adhesive or glue-type systems. In an optional preferred embodiment, grafting of the interior surface of, for example, a PE-based carrier pipe can allow post-manufacture application of art-known coatings that will reduce solvent penetration of the carrier pipe and/or retard microbial growth within a fluid-filled system of pipes, as needed.

In another preferred embodiment, additional components are optionally combined with the liquid composition. Such additional components include, e.g., one or more dyes or pigments that impart a heat-reflective property to the grafted coating, as well as with any other art-known components commonly added to paints and coatings. Such reflective colorants include, simply by way of example, finely divided metal powders, in a proportion sufficient to give the finished grafted coating a metallic and reflective appearance. Such metal powders, include, without limitation, aluminum, copper, brass, stainless steel, gold, chromium and /or any other suitable powdered material that will impart a heat reflective luster. Optionally, other reflective colorants are employed, separately or in combination with metallic powders. Such additional reflective colorants include, for example, powdered titanium dioxide, zinc oxide, and/or combinations thereof, in proportions that impart a reflective white appearance to the finished coating.

In a further preferred embodiment, suitable inorganic or organic dyes or pigments that impart a marking color that is not white or metallic are mixed into the grafting solution or covalently linked by art-known methods to one or more of the components of the liquid composition. These include colorants that impart red, green, orange, yellow, blue, violet and variations of these. Suitable colorants for this purpose include, simply by way of example, Tint Ayd EP or UL (Red), green yellow, and/or combinations thereof, that are commercially available, for example, from Daniel Products, Jersey City, N.J.). Additional such pigments or colorants include, e.g., zirconium oxide, zircon, zinc oxide, iron oxide, antimony oxide, and particularly weather resistant coated types of $TiO_2$. The pigments may also be blended with a suitable extender material which does not contribute significantly to hiding power. Suitable extenders include silica, baryte, calcium sulfate, magnesium silicate (talc), aluminum oxide, aluminum silicate, calcium silicate, calcium carbonate (mica), potassium aluminum silicate and other clays or clay-like materials. Where present, the pigments and extenders are normally present at a level of from about 0.1 to about 1.0 parts by weight per part by weight of the polymer components of the grafting composition, on a dry weight basis.

Further optional components of the liquid composition of the grafting solution and of the formed graft coating include, for example, anti-oxidants, U.V. absorbing compounds, and other stabilizers well known to the art in art-known proportions. The composition of this invention may also optionally include other ingredients in amounts which are commonly included in paint and lacquer formulations such, wetting agents, surfactants, bactericides, fungicides, mildew inhibitors, emulsifiers, suspending agents, flow control agents such as waxes or wax dispersions, level agents, thickening agents, pH control agents, slip agents such as silica or clay and the like.

In a still further embodiment, any of the above-described monomers, including, simply by way of example, dispersed polyurethane in combination with, e.g., epoxy prepolymers Epi-Rez™ (Shell Chemical Co., Parsippany, N.J.), and NeoRez R9679™ (Avecia, Inc., Charlotte, N.C.), are prelinked with suitable colored dyes or pigments by art-known methods in order to provide a fully grafted and permanently colored surface to the treated PE substrates. Methods for linking dyes or pigments to these monomers are art-known. For example, the desired colorants and/or pigments are dissolved in monomers/prepolymer solution and then applied onto the desired substrate by any effective method (e.g., dipping or spraying), following by curing at, e.g., at about 150° F. for about 20 to about 30 minutes.

Prepolymers and/or monomers are preferably employed in the grafting solution in a concentration ranging from about 0.1 to about 50%, by weight, relative to the solution. More preferably, the prepolymers and/or monomers are employed in a concentration ranging from about 0.1 to about 20%, by weight, relative to the solution.

Thus, the desired reagents, e.g., prepolymer(s) and/or monomers, catalyst, graft initiator system and other ingredients of the composition are mixed in a container with a compatible solvent or solvents to form Part A.

In yet a still further embodiment, one or more flame retardant agent or agents are added to the formulation, e.g., are added to Part A. Any art-known flame-retardant composition that is compatible and miscible with the components and solvents of the formulation is optionally employed. For example, art-known organic or inorganic phosphorous-based flame retardants are readily employed.

In particular, the flame retardant is a phosphorous-based flame retardant such as, for example, chlorinated phosphate esters, melamine derivatives, oligomeric phosphate esters, bromoaryl ether/phosphate product, and phosphonates. Exemplary flame retardants include, dimethyl methylphosphonat, diethyl-N,N-bis (2-hydroxyethyl) aminomethyl phosphonate, oligomeric chloroalkyl phosphate/phosphonate, tri (1,3-dichloroisopropyl) phosphate, oligomeric phosphonate, to name but a few.

These types of flame retarding agents, and others, are available, e.g., from Akzo Nobel Chemicals, Inc., Dobbs Ferry, N.Y., under the tradename of Fyrol™. Additional flame retardants include, for example, isopropylated triaryl phospates, aklyl aryl phosphates, t-buryl triaryl phosphates, triaryl phosphates and resorcinol diphenyl phosphate, which are available, e.g., from Akzo Nobel Chemicals, Inc., supra, under the tradenames of Fyroflex™ and Phosflex™' The Akzo Phosflex™ products include, e.g., tributyl phosphate, isopropylated triphenyl phosphate ester, to name but a few.

As exemplified herein, dimethyl methylphosphonate, available as Fyrol™ DMMP from Akzo Nobel Chemicals, Inc., is mixed into the formulation, alone and/or in combination with any other suitable flame retardant material. The following table summarizes the flame retardant additives available from Akso Nobel Chemical, Inc., by both generic and trade names, and is provided for the convenience of the reader, and is not intended to limit the scope of the invention in any way.

| Akzo Tradename | |
|---|---|
| Chlorinated Phosphate Esters | |
| Fyrol ™ FR2 | tri (1,3-dichloroisopropyl) phosphate |
| Fyrol ™ CEF | tri (2-chloroethyl) phosphate |
| Fyrol ™ PCF | tri (2-chloroisopropyl) phosphate |
| Fyrol ™ 38 | tri [1,3-dichloroisopropyl] phosphate |
| Oligomeric Phosphate Esters | |
| Fyrol ™ 25 | oligomeric chloroalkyl phosphate/phosphonate |
| Fyrol ™ 51 | oligomeric Phosphonates |
| Fyrol ™ AH | |
| Fyrol ™ 99 | oligomeric chloroalkyl phosphate |

-continued

| Akzo Tradename | |
|---|---|
| Inorganic Phosphates | |
| Fyrex ™ | diammonium and monoammonium phosphate salt |
| Flexible Fyrex ™ | diammonium and monoammonium phosphate salt |
| Monomeric and Oligomeric Phosphonates | |
| Fyrol ™ DMMP | dimethyl methylphosphonate |
| Fyrol ™ 6 | diethyl N,N bis [2-hydroxyethyl] aminomethyl phosphonate |
| Melamine Derivatives | |
| Fyrol ™ MC | melamine cyanurate |
| Fyrol ™ MP | melamine phosphate |
| Bromoaryl Ether/Phosphate Product | |
| Fyrol ™ PBR | pentabromodiphenyl oxide/phosphate ester |

Flame retardant(s) are added to Part A in a proportion that enhances the flame retardant properties of the graft coating without impairing other desirable properties as described and defined herein. Thus, based on the foregoing, the artisan will appreciate what amounts/proportions of flame retardant to add to Part A. Simply by way of example, the flame retardant component(s) is added to Part A in a proportion of about 0.1 wt percent to about 10 wt percent. More particularly, the flame retardant is added to Part A in a proportion ranging from about 0.5 wt percent to about 5 wt percent. Preferably, when the flame retardant is, e.g., Fyrol™ DMPP, it is added in a proportion ranging from about 0.5 wt percent to about 3 wt percent, or more.

The pH of the formulated liquid composition should preferably be in the range of from about 6–8, and appropriate amounts of a suitable acid, e.g. phosphoric or acetic acids or a base, e.g. sodium hydroxide, ammonia or ammonium hydroxide, may be included into the composition to adjust the pH as necessary.

Formulation of Part B

Part B of the grafting solution is prepared as a separate solution to contain a polymerization promoter, such as a crosslinking compound. This strategy avoids premature gelation or hardening of the composition over periods of storage. Suitable crosslinking compounds include any art-known crosslinkers that will react with, and enhance crosslinking of the monomers or prepolymers employed for the grafting process. Such a polymerization promoter is particularly desired where the polymeric component contains functional groups which are capable of undergoing ionic condensation reactions, e.g., carboxy, hydroxy or epoxy.

Suitable polymerization promoters or crosslinking agents include melamine based amino resins such as hexamethoxymethylmelamine, benzoguanamine resins, urea formaldehyde resins, glycoluryl-based resins and like materials. Preferred crosslinking agents are those which are active at ambient temperatures, i.e., from about 20 to about 30° C. and include epoxy silanes such as gamma glycidoxypropyltrimethoxy silane, beta-(3,4-epoxycyclohexyl) ethyltrimethoxy silane and polyfunctional aziridines, In particular, the selected crosslinker is reactive with prepolymer or polymer carboxyl groups.

The crosslinker exemplified herein is a polyfunctional aziridine liquid crosslinker, such as, for example, 1-aziridinepropanoic acid, 2-methl-, 2 ethyl-2-(3-(2-methyl-1-azirindinyl)-1-oxypropoxy) methyl)-1,3-propandiyl ester marketed by Zeneca Resin, Wilmington, Mass., under the tradename Crosslinker CX-100™. This is a trifunctional material with an equivalent weight of 156, that is used to crosslink monomers, prepolymers and/or polymers with reactive carboxyl functionality, in both water-based and organic solvent-based systems.

Optionally, other art-known components are provided in Part B, include, simply by way of example, hardeners stabilizers and the like. For those embodiments comprising epoxy monomers or precursors, hardener or curing agents include, e.g., hardeners or curing agents such as, for example, those comprising amidoamines, polyamides, cycloaliphatic amines and the like. Polyamine epoxy curing agents or hardeners, e.g., including those comprising trimethylhexamethylenediamine, are commercially available, for example, from Air Products and Chemicals, Inc. Allentown, Pa.)

The Grafting Solution and Process

Parts A and B are mixed in a suitable proportion, stirred to a uniform solution, and the resulting grafting solution is applied to the PE substrate to be treated. The time necessary for the reaction to run to completion depends up the reaction temperature, the reagents employed and the desired properties of the grafted PE. Generally, the solution is air dried onto the PE substrate, and then cured by the application of heat for a time period ranging, e.g., from about 1 to about 4 hours, at a temperature ranging, e.g., from about 100 to about 150 degrees F. When heat curing is undesirable, the coated substrate can optionally be allowed to cure at ambient temperature, e.g., 25–30 degrees C., for up to 6 or more days.

Confirming the Properties of the Grafted Surface

The graft coatings were also tested for their ability to resist melting and catching fire for a time period, by exposure to a standardized source of intense radiant heat, as described in greater detail in the Examples, infra. Surface energy was tested using standardized wet-ability inks, described as follows.

Surface Energy Testing

A number of art-known methods are available for determining the improvement in adhesion of paints, cements, adhesives and the like to surfaces. The graft coated surfaces of PE samples were tested for their surface energy by a standardized commercial test of surface wet-ability using inks of known surface tension. The adhesion and/or paintability properties of the grafted surfaces depend upon the surface energy. A commercially available wet-ability ink is the Corona-plus Pro-Dyn Test Ink™ (Vetaphone Company, Denmark). The test inks are formulated in standard felt-tipped pens, with inks that are rated by their surface tension in dynes/cm$^2$. If a surface is marked and the line of ink breaks up into small droplets (reticulates) within 3 seconds, then the surface has a surface energy lower than the surface tension rating of the ink. In essence, if the surface can be wet by the ink, the surface energy of the treated surface (e.g., the tested graft coating) is higher than the surface tension rating of the ink, in dynes/cm$^2$.

These test inks are marketed in 2-dyne/cm$^2$ increments, so that the surface energy of the grafted coatings is readily determined, and the graft coated sample articles produced by the following examples have been shown to have a surface energy of at least 56 dynes/cm$^2$, which is within the limits of the testing reagents available at the time of testing. Higher surface energy results, e.g., up to 80 dynes/cm$^2$, and greater, are expected to be confirmed with the availability of wet-ability testing reagents of greater surface tension limits.

EXAMPLES

The following examples serve to provide further appreciation of the invention but are not meant in any way to restrict the effective scope of the invention.

Example 1

Solvent-Based Grafting Formulation with Urethane Prepolymer

A sample of polyethylene board (HDPE of about 15×60 cm) was treated by grafting urethane and silane monomer to the HDPE surface. Reagents are shown in Table 1, below.

TABLE 1

|  | Parts by Weight |
| --- | --- |
| PART A |  |
| Aliphatic Moisture Curing Urethane M27-X-63 | 100.0 |
| Toluene | 10.0 |
| Aluminum Paste 251 PA | 8.0 |
| Silquest ™ Silane A-171 ™ | 1.0 |
| (OSi Specialties, Inc., Danbury Connecticut) |  |
| MEK-Peroxide (0.1% in MEK solution) | 0.2 |
| Silver Perchlorate (0.1% in MEK solution) | 0.1 |
| \PART B |  |
| Crosslinker CX-100 | 1.8 |

Preparation of Part A

Aliphatic moisture curing urethane prepolymer M27-X-63 was taken in a container, and to it were added monomers, catalyst, graft initiator system and the other ingredients of the composition were added in the weight proportions shown by Table 1, supra. The resulting mixture was then stirred to form a uniform solution of Part A.

Preparation of the Formulation:

The Part A solution was mixed into a separate container with the Part B solution, in the weight proportions shown above by Table 1. The mixed formulation was stirred to a uniform solution for the grafting process.

Application of the Grafting Coating:

The polyethylene samples and related parts were coated with the grafting solution by spraying. The coated parts were air dried for 30 minutes, subjected to cure for 2 hours at 180° F. or at ambient conditions for one day. The coated samples thus prepared were studied for various characteristics.

The graft coating was shown by the test to have a surface energy of at least 56 dynes/cm$^2$, thus confirming enhanced adhesion and paintability.

Example 2

Water-Based Grafting Formulation with Urethane Prepolymer

In addition to the solvent-based grafting formulation of Example 1, water-based grafting formulations were also prepared. Table 2, below, provides a water-based urethane formulation.

TABLE 2

| | Parts by Weight |
|---|---|
| PART A | |
| Urethane Prepolymer NeoRez 9679 | 100.0 |
| Epi-Rez Resin 3515-W-60 | 7.0 |
| Deionized water ("DIW") | 20.0 |
| E-B Solvent | 15.0 |
| Aluminum Paste 251 PA | 8.0 |
| Silquest ™ Silane A-151 | 1.0 |
| (Witco OrganoSilicones Group/OSi Specialties, Inc.) | |
| Ferrum Ammonium Sulfate (1% in water solution) | 0.2 |
| Urea Peroxide (1% in water solution) | 0.1 |
| PART B | |
| Crosslinker CX-100 | 2.4 |

Preparation of Part A

Urethane prepolymer NeoRez 9679 was taken in a container and to it were added monomers, catalyst, graft initiator and other ingredients of the composition in the proportions described supra by Table 2. The contents were stirred to a uniform solution. The ingredients were taken in the concentration ratio as indicated in the composition by weight.

Preparation of Full Formulation

The contents of Part A were mixed with PART B, in the proportions shown by Table 1. This was followed by stirring the mixture to a uniform solution, as described for Example 1, supra.

Method of Application of the Formulation

The polyethylene parts were coated by spraying. The coated parts thus prepared were air dried for 30 minutes, followed by curing at 180° F. for 2 hours or at ambient conditions for one day. The coated parts were then studied for various characteristics.

The graft coating was shown by the test to have a surface energy of at least 56 dynes/cm$^2$, thus confirming enhanced adhesion and paintability.

Example 3

Water-Based Grafting Formulation with Urethane and Epoxy Prepolymers

Water-based grafting formulations combining both urethane and epoxy-based prepolymers were also prepared. Table 3, below, provides a water-based urethane/epoxy formulation.

TABLE 3

| | Parts by Weight |
|---|---|
| PART A | |
| Urethane Prepolymer NeoRez 9679 | 100.0 |
| Epi-Rez Resin 3515-W-60 | 7.0 |
| DIW | 7.0 |
| Tint Ayd WD2673 | 8.0 |
| Silquest ™ Silane 151 | 1.0 |
| (Witco OrganoSilicones Group/OSi Specialties, Inc.) | |
| Ferrum Ammonium Sulfate (1% in water solution) | 0.2 |
| Urea Peroxide (1% in water solution) | 0.1 |

TABLE 3-continued

| | Parts by Weight |
|---|---|
| PART B | |
| Crosslinker CX-100 | 2.5 |

Parts A and B are combined in the indicated weight proportions, and HDPE samples were treated as described above for Examples 1–3.

The graft coating was shown by the test to have a surface energy of at least 56 dynes/cm$^2$, thus confirming enhanced adhesion and paintability.

Example 4

Organic Solvent-Based Grafting Solution-1 with Epoxy Prepolymer

Yet another grafting formula was prepared and applied to a polyethylene sample by the same methods described for Example 1, supra, but employing the following different composition, as shown below in Table 4.

TABLE 4

| | Parts by Weight |
|---|---|
| PART A | |
| *(a) Epoxy prepolymer Araldite GZ 488-N-40 | 100.0 |
| Epoxy Resin (Ciba Geigy Corp.) | |
| (b) D.R.R. G84 EK 40 | 100.0 |
| Epoxy Resin (Dow Chemical) | |
| Methy Ethyl Ketone | 75.0 |
| Xylene | 20.0 |
| Aluminum Paste Eternabrite Primier 251 PA | 8.0 |
| Methy Ethyl Ketone Peroxide | 0.2 |
| Silver Perhlorate 0.1% | 0.2 |
| (methyl ethyl ketone solution) | |
| Silquest ™ Silane A-151 | 0.5 |
| (OSi Specialties, Inc., Danbury Connecticut) | |
| PART B | |
| Desmodue CB-75 | 5.0 |
| Aromatic polyisocyanate | |
| (Bayer Indust. Chemical Div.) | |
| Xylene | 15.0 |

*Optionally, either epoxy resin (a) or (b) can be used, but (a) was employed in this example.

Parts A and B were combined in the indicated weight proportions and then the mixture was sprayed onto the HDPE substrate, and cured at room temperature for 7 days, or at 190 degrees F. for 2 hours.

The graft coating was shown by the test to have a surface energy of at least 56 dynes/cm$^2$, thus confirming enhanced adhesion and paintability.

Example 5

Organic Solvent-Based Grafting

Solution-2 with Epoxy Prepolymer and Flame Retardant

A second organic solvent based grafting formula was prepared and applied to a polyethylene sample by the same methods described for Example 1, supra, but employing the composition shown below in Table 5.

TABLE 5

| | Parts By Weight |
|---|---|
| PART A | |
| Epoxy prepolymer Araldite GZ488-N-40 ™ (Ciba-Geigy) | 3500.0 |
| Methyl ethyl ketone | 2625.0 |
| Xylene | 700.0 |
| Cellusolve acetate (EE Acetate ™, Pride Solvents and Chem. Co.) | 350.0 |
| Aluminum paste 251 PA | 210.0 |
| Silquest ™ Silane A-187 (Witco OrganoSilicones Group/OSi Specialties, Inc.) | 50.0 |
| Ferrum ammonium sulfate 1% MEK solution | 25.0 |
| Silver perchlorate 1% MEK solution | 25.0 |
| Fyrol ™ DMMP (Akzo Nobel Chemicals, Inc., Dobbs Ferry, New York) | 1000.0 |
| PART B | |
| Urethane prepolymer Aromatic Polyisocyanate Desmodur CB-75 ™ (Bayer Indust. Chem. Div.) | 240.0 |
| Xylene | 500.0 |

Parts A and B were mixed in a ration of Part A: Part B of 10:0.87. The resulting grafting formulation was spray coated onto the substrate, followed by a curing step. Curing was conducted at room temperature for 30 minutes, and then by heating for 30 min. at 160–180° F.

The graft coating was shown by the test to have a surface energy of at least 56 dynes/cm², thus confirming enhanced adhesion and paintability.

Example 6

Aluminum Color Graft Coating

Yet a further grafting formulation was prepared using the components shown below in Table 6. Part A was mixed with Part B in the ratio of 100:8.7 by weight. The applied coating was air dried for 30 minutes at room temperature, 30 minutes at 165° F.

TABLE 6

| | Parts By Weight |
|---|---|
| PART A | |
| Epoxy prepolymer Araldite GZ 488N40 | 100.00 |
| Methyl Ethyl Ketone | 75.00 |
| Xylene | 20.00 |
| Cellosolve acetate | 10.00 |
| Silane A1100 | 2.28 |
| Fyrol ™ DMMP | 31.50 |
| Silver perchlorate 0.1% solution | 0.21 |
| Aluminum paste 251A | 4.28 |
| MEK peroxide 1.1% MEK solution | 0.20 |
| PART B | |
| Desmodur CB-75 ™ (Bayer Indust. Chem. Div.) | 6.86 |
| Xylene | 14.28 |

Example 7

Clear Grafting Coating

An even further grafting formulation was prepared using the components shown below in Table 7. Part A was mixed with Part B in the ratio of 100:25, by weight. The applied coating was air dried for 30 minutes at room temperature, 40 minutes at 170° F.

TABLE 7

| | Parts By Weight |
|---|---|
| PART A | |
| Epoxy prepolymer Epon 815 | 100.00 |
| Methyl ethyl ketone | 62.50 |
| Toluene | 18.75 |
| Fyrol ™ DMMP | 25.00 |
| Silane A1100 | 2.50 |
| Silver perchlorate 1.1% MEK solution | 0.10 |
| MEK peroxide 1.1% MEK solution | 0.10 |
| PART B | |
| Amine hardener Ancamine ™ 1617 (Epoxy hardener or curing agent comprising trimethylhexamethylenediamine from Air Products and Chemicals, Inc. Allentown, Pennsylvania) | 50.00 |

Example 8

Thermal Testing

The improvement in fire resistance of an HDPE substrate provided by the grafting treatment of Example 4, supra, was confirmed by heat testing.

Testing Method

In brief, samples of the treated HDPE materials, together with untreated controls, were subjected to intense heat from an 800° C. gas-fired heating panel in an apparatus designed for this purpose, a Model B32 SX designed by BSM. The heating panel was rectangular in shape, and measured 25×51 cm, and was rated at 11800 Watts. The graft-treated HDPE sample was light colored, and the untreated HDPE sample was the typical black found in production-grade pipes.

The B32 SX testing apparatus is designed with a heat shield that allows the heating panel to reach a predetermined, uniform temperature before the test cycle begins. Thus, the heating panel was turned on, and after it reached 800° C., the samples were clamped into the apparatus at a distance of about 12.5 cm from the heating element, and the heat shield raised (time 0). The samples were observed and the elapsed time to ignition (open fire and the emission of burning drops) was recorded for each sample.

Results for Untreated HDPE Sample

Temperature of radiating surface: 800° C.

0:00 min.: sample was placed in testing stand and heat exposure started.

3:40 min.: sample was openly burning and emitting burning drops of molten plastic.

Results for Graft Treated Sample of Example 4

Temperature of radiating surface: 800° C.

0:00 min.: sample was placed in testing stand and heat exposure started.

16:50 min.: sample was openly burning and emitting burning drops of molten plastic.

Results for Graft Treated Sample of Example 5

Temperature of radiating surface 960° C.

0:00 min.: sample was placed in testing stand and heat exposure started.

18:00 min.: sample was openly burning and emitting burning drops of molten plastic.

These results confirm that a significant increase in heat resistance/time to ignition is provided by the graft treatment.

Numerous references are mentioned throughout this specification, the disclosures of which are incorporated herein by reference in their entireties.

What is claimed is:

1. A graft coated substrate, the substrate comprising polyethylene, and a graft coating covalently bonded thereto, wherein said graft coating comprises a non-polyethylene polymer or copolymer and a flame retardant;

said graft coated coated substrate prepared by a process comprising;

applying a liquid composition to the substrate;

wherein the liquid composition comprises a monomer or prepolymer, a metal ion graft initiator, a peroxide catalyst, a polymerization promoter reactive with the monomer or prepolymer, and a flame retardant and polymerizing the monomer or prepolymer to the substrate; and wherein the process further comprises preparing the liquid composition by combining a Part A solution and a Part B solution prior to application to the substrate, wherein the Part A solution comprises:

(i) a monomer or prepolymer suitable for grafting to the substrate, in an amount ranging from 0.1 to about 50%, by weight of the liquid composition, selected from the group consisting of water-dispersed epoxy monomers, aliphatic moisture-curable urethanes, aromatic urethane prepolymers, silane prepolymers, vinyl and epoxy functional silanes and combinations thereof;

(ii) a metal ion graft initiator in an amount ranging from about 0.01 to about 1.0% by weight, relative to the weight of prepolymer or monomer in the liquid composition, selected from the group consisting of ions of silver, iron, silver, cobalt, copper and cerium;

(iii) a peroxide catalyst in an amount ranging from about 0.1 to about 5%, selected from the group consisting of hydrogen peroxide, an organic peroxide, and combinations thereof;

(iv) a flame retardant in an amount ranging from about 0.1 wt percent to about 10 wt percent of the solution, selected from the group consisting of chlorinated phosphate esters, melamine derivatives, oligomeric phosphate esters, bromoaryl ether/phosphate product, and phosphonates and; a compatible solvent or solvents;

wherein the Part B solution comprises a polymerization promoter.

2. The graft coated substrate of claim 1 wherein the polymerization promoter is selected from the group consisting of a polyfunctional aziridine liquid crosslinker and an aromatic polyisocyanate, in a concentration effective to react with, and crosslink, the monomer or prepolymer.

3. The graft coated substrate of claim 2 wherein the monomer or prepolymer comprises an epoxy moiety, and the Part B solution further comprises at least one epoxy hardener or curing agent.

4. A graft coated substrate, the substrate comprising polyethylene, and a graft coating covalently bonded thereto, wherein said graft coating comprises a non-polyethylene polymer or copolymer and a flame retardant;

said graft coated substrate prepared by a process comprising:

applying a liquid composition to the substrate;

wherein the liquid composition comprises a monomer or prepolymer, a metal ion graft initiator, a peroxide catalyst, a polymerization promoter reactive with the monomer or prepolymer, and a flame retardant and polymerizing the monomer or prepolymer to the substrate; and wherein the graft initiator of the liquid composition is selected from the group consisting of ions of iron silver, cobalt, copper, cerium and combinations thereof in a concentration ranging from about 0.01 to about 1.0%, by weight, relative to the liquid composition.

5. The graft coated substrate of claim 4 wherein the graft initiator of the liquid composition is a silver ion.

6. A graft coated substrate, the substrate comprising polyethylene, and a graft coating covalently bonded thereto, wherein said graft coating comprises a non-polyethylene polymer or conolymer and a flame retardant;

said graft coated coated substrate prepared by a process comprising; applying a liquid composition to the substrate;

wherein the liquid composition comprises a monomer or prepolymer, a metal ion graft initiator, a peroxide catalyst, a polymerization promoter reactive with the monomer or prepolymer, and a flame retardant and polymerizing the monomer or prepolymer to the substrate: and wherein the polymerization promoter of the liquid composition is selected from the group consisting of a polyfunctional aziridine liquid crosslinker and an aromatic polyisocyanate, in a concentration effective to crosslink the monomer or prepolymer.

7. A graft coated substrate, the substrate comprising polyethylene, and a graft coating covalently bonded thereto, prepared by a process comprising the steps of:

(a) contacting the substrate with a liquid composition comprising, (i) a monomer or prepolymer suitable for grafting to the substrate, in an amount ranging from 0.1 to about 50%, by weight of the liquid composition, selected from the group consisting of water-dispersed epoxy monomers, aliphatic moisture-curable urethanes, aromatic urethane prepolymers, silane prepolymers, vinyl and epoxy functional silanes and combinations thereof;

(ii) a metal ion graft initiator in an amount ranging from about 0.01 to about 1.0%, by weight, relative to the weight of prepolymer or monomer in the liquid composition, selected from the group consisting of ions of silver, iron, silver, cobalt, copper and cerium;

(iii) a peroxide catalyst in an amount ranging from about 0.1 to about 5% by weight of the liquid composition, selected from the group consisting of hydrogen peroxide, an organic peroxide, and combinations thereof, (iv) an effective amount of a polymerization promoter; and a compatible solvent or solvents, and (b) grafting the liquid composition on the substrate.

* * * * *